Patented Aug. 9, 1938

2,125,901

UNITED STATES PATENT OFFICE 2,125,901

FINISHING TEXTILE MATERIALS

John Gwynant Evans and Charles Edward Salkeld, Blackley, Manchester, England, assignors to Imperial Chemical Industries Limited, a corporation of Great Britain No Drawing. Application January 14, 1937, Serial No. 120,636. In Great Britain January 15, 1936

15 Claims. (Cl. 91—70)

This invention relates to a novel process for finishing textile materials, including in this term fabrics, films and threads of natural or artificial cellulosic material, as well as paper. More particularly this invention deals with a process of fixing starch upon fabrics, yarns, woven or plaited straw (as on hat material) or papers hereinafter referred to as the materials, some of which are normally subjected to starching and some of which are not, whereby to render said starching effect "permanent", that is, resistant to washing or other aqueous treatment processes.

As is well known, starches, e. g. wheat starch, tapioca starch, corn starch, potato starch, or rice starch are widely used as finishing agents for textiles. For certain purposes it is desirable for the finish so obtained to be resistant to removal from the fibre in washing or other operations involving treatment with water.

It is accordingly an object of our invention to provide a novel process for rendering starched fabric resistant to washing. It is a further object of the invention to provide a process whereby starch may be used as a finishing agent in paper making and in the manufacture of straw hats and the like. Other and further objects of this invention will appear as the description proceeds.

We have found that when the materials referred to are treated with a quaternary organic compound of the general formula:

R—X—CH₂—N(tert.)—Y as more fully defined below, either before or after or simultaneously with a starching operation, the resulting starch finish acquires a "permanent" character in the sense that it is not removed by washing. This effect is of tremendous practical significance in relation to textile fabrics because it saves the labor, materials and cost of repeated starching each time an article of apparel, for instance, is laundered. By the operation of our invention the starch becomes "fixed", so to speak, upon the fabric.

In the above formula "N (tert.)" stands for the nitrogen atom of a tertiary base capable of forming a salt or quaternary compound. The tertiary base may be heterocyclic such as pyridine, picoline, quinoline, or it may be aliphatic, for instance trimethylamine, triethylamine or triethanol-amine. Tertiary aromatic bases, for instance, dimethylaniline are preferably not included as their use in the manufacture of compounds of the formula given is attended with difficulty, because there is a liability that nuclear substitution takes place.

Also in the general formula Y stands for the anion of a salt forming acid, for instance chloride, bromide, methyl-sulfate, acid-oxalate, etc., and X stands for a non-carbonic link selected from the group consisting of oxygen, sulfur, imino (NH), and substituted imino (N-alkyl, N-aralkyl, N-aryl, N-acyl, N-carbo-alkoxy, etc.).

R in the general formula stands for any organic radical which is free from water-solubilizing groups, and may be either aliphatic or aromatic, straight-chain or branched-chain, saturated or unsaturated, alkyl or acyl. Also it may be divalent whereby the formula takes on a Siamese-twin aspect. As typical illustrations of R when X stands for oxygen or sulphur may be mentioned methyl, butyl, octyl, undecyl, dodecyl, cetyl, octadecyl, and octadecenyl,—these are saturated and unsaturated aliphatic hydrocarbon radicals; the radicals of the sperm oil alcohols also come into consideration, a mixture being used. When X stands for NH or N-alkyl, R may stand for stearamido, oleylamido or acetamido. Other permissible variations of R will become apparent from the further examples given below.

The method of applying these "fixing agents" to the material being treated may take the form of at least three different procedures, as follows:

For example, the starch solution or paste, is applied and the material is then treated in the wet or dry state in a bath containing one of the above mentioned quaternary salts, being then optionally dried at ordinary or higher temperatures and being finally heated for a short time at still more elevated temperatures, e. g. above 100° C.

Alternatively, the quaternary salt is initially applied to the material and the starch solution or paste is then applied, the material being then dried at ordinary or somewhat higher temperature and heated as before described for a short period at a still more elevated temperature, e. g. above 100° C., or being dried at this temperature directly after application of the starch solution or paste.

A further method of carrying the invention into practical effect is to mix the quaternary salt and the starch in any convenient manner, to apply the mixture to the material, and to heat with or without intermediate drying, as before described.

It will be noted that each of the above procedures involves as a final step the heating of the treated and starched material at a temperature of about 100° C. This step will hereinafter be referred to as the "baking" step, and has as its object to decompose the quaternary compound liberating the tertiary base, which evaporates off, and leaving behind the remainder of the molecule in some form which apparently enters into some sort of physical or chemical combination with the fabric or with the starch. The baking temperature therefore may vary between the lowest value which will bring about decomposition with liberation of the free base and the highest temperature tolerable by the starch or the fabric. A practical thumb-rule is to bake at a temperature between 90 and 140° C.

For best results it is preferable to dry the material after impregnation with starch and fixing agent but before the baking step. However, this step is not a limitation upon this invention, since good results are in many cases obtained by omitting it. In other words, in these cases the drying step is merged into the baking step. The temperature of the drying step is in the average case not higher than about 40–50° C. But in some cases, temperatures as high as 90° C. may be employed. In general, the object of the drying step is to avoid hydrolysis of the fixing agent as the temperature of baking is approached. Consequently, a choice of conditions for drying will in the cases of each compound be guided by its stability in the presence of moisture at elevated temperatures.

The finish produced on fabrics processed in the above manner is highly resistant to the action of aqueous liquors, hot or cold. At the same time, when quaternary salts containing an alkyl chain of 10 or more carbon atoms are used, the fabric becomes particularly smooth and pleasant to handle. It also becomes water repellent.

To prevent possible injury to the material during the baking step due to any acid which might be liberated, the entire process may if desired be carried out in the presence of acid binding agents, or in the presence of salts of mild acids which are capable of acting as buffers. As illustrations of such compounds may be mentioned: borax, magnesium hydroxide, pyridine, aniline, and other weakly basic substances; sodium acetate and other buffers. Acetic acid, phthalic acid, or other mild acid may also be present if desired.

If desired, other finishing agents or adjuvants may be added to the treatment fluids referred to above, for the purpose of facilitating the application of either the starch or the fixing agent, or for the purpose of effecting their own specific functions on the fibre. For instance, there may be added suitable wetting or dispersing agents. or, as illustrations of additional functional agents there may be mentioned water-insoluble pigments (such as are used as dulling agents for artificial silks), for instance, china clay, barytes, titanium dioxide; finishing agents, for instance, magnesium sulphate; softening agents, for instance, Turkey red oil, tallow, soaps, sulphuric esters of long chain alcohols, or waxes, for instance, paraffin wax, carnauba wax, Japan wax, also adhesives, for instance, dextrine, gums, glues, Iceland moss.

The concentration of fixing agent in the treatment bath will vary depending on the relative proportion of starch which it is desired to affix to the fibre. As a general rule it may be said that the quantity of agents to be used will be about one part to every 10 parts of starch to be fixed. For adequate fixation of starch fillings on textiles it may sometimes be necessary to use proportionately more fixing agent. However for particular finishes it is possible to use less.

Without limiting our invention to any particular procedure, the following examples ar given to illustrate our preferred mode of operation. Parts mentioned are by weight.

Example 1

Cotton sheeting is treated at 100° C. with a starch paste containing 10 parts by weight of corn starch in 90 parts by weight of water. The material is squeezed and is then dried. This dry starched material is padded at room temperature in a solution containing 1 part by weight of methyloxymethyl pyridinium chloride in 99 parts by weight of water. It is then squeezed, dried below 40° C. and baked for 30 minutes at a temperature of 105° C.

The treated material now possesses a smooth stiff finish which is resistant to removal by laundering treatments.

Example 2

Cotton sheeting is impregnated at 100° C. with a starch paste containing 10 parts by weight of potato starch and 1 part by weight of cetoxymethyl pyridinium chloride in 89 parts of water. The material is then squeezed and dried for 10 minutes at a temperature of 120° C.

It now possesses a smooth stiff finish which is resistant to laundering treatments.

Example 3

Cotton sheeting is padded at room temperature in a solution containing 2 parts of octadecoxymethyl pyridinium chloride in 98 parts of water. The material is squeezed and dried at a temperature of 30°–40° C. It is now treated at 60° C. with a starch paste containing 10 parts of potato starch in 90 parts of water. The material is squeezed, dried at a temperature of 40°–50° C. and is then heated in an oven for 10 minutes at a temperature of 105° C.

The material now possesses a pleasing smooth stiff finish which is resistant to laundering treatments. The material is also water repellent.

Example 4

Cotton sheeting is treated at 80° C. in a starch paste containing 10 parts of potato starch in 90 parts of water. The material is squeezed and dried. The dry, stiffened material is padded at room temperature in a solution containing 1 part of octadecoxymethylpyridinium chloride and 1 part of pyridine in 98 parts of water. The material is squeezed, dried below 40° C. and baked for 1 hour at 90° C.

The material now possesses a pleasing smooth stiff finish which is resistant to laundering treatments.

The pyridine in the above example may be replaced by other basic substances such as borax, or by acidic substances such as acetic acid.

Example 5

Cotton sheeting is treated at 100° C. in a starch paste containing 10 parts of potato starch in 90 parts of water. The material is squeezed and dried at 100° C. It is now treated, in a continuous padding operation with a hot solution containing 1 part of octadecoxymethyl pyridinium chloride in 99 parts of water. The material is squeezed, dried and then heated for 30 minutes at a temperature of 105° C.

It now possesses a stiff finish which is resistant to laundering.

Example 6

A starch paste containing 10 parts by weight of potato starch in 90 parts by weight of water is applied to cotton sheeting at 100° C. The material is squeezed and dried at 100° C. It is then treated at 45° C. in a continuous padding operation, with a solution containing 2 parts by weight of cetoxymethyl pyridinium acid oxalate (prepared as described below in Recipe C) in 198 parts by weight of water. The material is squeezed, dried at 60° C. and heated for 3 minutes at 140° C.

The material now possesses a pleasing smooth stiff finish which is resistant to laundering.

Example 7

A linen damask table cloth is treated at 50° C. with a starch paste containing 10 parts of potato starch, 6 parts of a 14% aqueous emulsion of paraffin wax and 1 part of octadecoxymethyl pyridinium chloride in 183 parts of water. The material is squeezed, dried at 60° C. and baked for 15 minutes at 105° C.

The material now possesses a pleasing smooth, stiff finish, and is also water repellent. The stiff finish and water repelling are resistant to laundering treatments.

Example 8

Cotton sheeting is treated with a hot starch paste containing 5 parts of potato starch in 95 parts of water. The material is squeezed and dried. The dry material is padded at 35° C. in a solution containing 1 part of stearamidomethyl pyridinium chloride in 99 parts of water. It is squeezed, dried below 40° C. and heated for 5 minutes at 120° C.

The material now possesses a pleasing smooth stiff finish which is also water repellent. The stiff finish is resistant to laundering.

Example 9

A linen damask table cloth which has been treated with a starch paste containing 5 parts of wheat starch in 95 parts of water is squeezed, dried and then padded at room temperature in a solution containing 1 part of the bis(chloro-pyridinium-methyl-ether) of ethyleneglycol (prepared as described below, Recipe D) in 199 parts of water. The material is squeezed, dried at a temperature of 30°–40° C. and is then heated for a period of 15 minutes at 105° C.

The full stiff handle on the material is thus rendered resistant to laundering.

Example 10

A "butter muslin" material is filled with a starch paste containing 10 parts of potato starch and 20 parts of china clay in 70 parts of water. The quantity of filling applied is from 100% to 150% on the weight of unfilled material. The filled material is dried and is padded at room temperature in a solution containing 5 parts of cetoxymethyl pyridinium pyridine sulphite or pyrosulphite (prepared as described below, Recipe E) in 95 parts of water. The material is squeezed, dried at a temperature of 30–40° C. and is then baked for 30 minutes at 105° C.

The filling in the material is now resistant to laundering, the china clay particles adhering to the material during washing treatments.

Example 11

Cotton fabric is impregnated with a 5% aqueous paste of farina (potato starch) containing per 1,000 parts of paste 2 parts of the reaction product obtained by reacting stearamide, pyridine and paraformaldehyde with gaseous sulphur dioxide as described in Recipe F below. The fabric is squeezed and dried at a temperature of 40° C. It is then heated for 30 minutes at a temperature of 105° C. The resulting fabric has a stiff finish which is not readily removed or damaged by washing.

Example 12

Cotton fabric is impregnated with an aqueous paste of farina (potato starch) containing per 100 parts of paste 5 parts of farina and 0.2 part of the reaction product from cetyl alcohol, pyridine, paraformaldehyde and gaseous sulphur dioxide (see Example 10 above and Recipe E below). The impregnated fabric is then treated as described in Example 1. The resulting fabric has a stiff finish which is not readily removed or damaged by washing.

Example 13

Both surfaces of cotton sheeting are treated with a hot starch paste containing 10 parts of potato starch and 2 parts of finely powdered Monolite Fast Red R (Colour Index No. 69) in 88 parts of water. The material is squeezed and dried. The coloured, stiffened material thus obtained is padded at room temperature in a solution containing 1 part of octadecoxymethyl pyridinium chloride in 99 parts of water. It is squeezed, dried below 40° C. and heated for 30 minutes at 105° C.

The material now possesses a coloured stiff finish which is resistant to laundering, the coloured pigment adhering to the cloth during washing treatments.

Example 14

Plain weave gray cotton cloth is treated on both surfaces with a starch paste containing 10 parts of potato starch and 2.5% parts of finely powdered Prussian Blue in 90 parts of water. The material is squeezed and dried. The stiff coloured material thus obtained is now padded at 45° C. in a solution containing 1 part of cetoxymethyl pyridinium acid oxalate (see above), in 99 parts of water. The material is squeezed, dried in a current of warm air at a temperature of 30°–40° C. and is then heated for 30 minutes at 105° C.

The stiff finish on the material is resistant to the action of water, the incorporated blue pigment showing no tendency to fall away from the cloth during washing treatments.

Example 15

Finely woven cotton material, so called cotton limbric, is padded with a 10% aqueous potato starch paste. The padded material is squeezed, dried and then padded for ten minutes at 20° C. in a 1.0% aqueous solution of a compound obtained by reacting stearamide, paraformaldehyde and Pyridine hydrochloride in pyridine as described in Recipe A below. The material is then squeezed, dried at 35°–40° C. and finally heated at 120° C. for 30 minutes. The resulting fabric has a stiff finish which is not spoiled by washing with soap and water.

Example 16

Cotton material as used in Example 15 which has previously been padded in a 10% aqueous potato starch paste is squeezed and then immersed for ten minutes at 20° C. in a 1.0% aqueous solution of a compound obtained by reacting stearohydroxymethylamide with pyridine-sulphur trioxide in pyridine as described in Recipe B below. The cotton material is again squeezed, dried below 40° C. and then heated for 30 minutes at 120° C. The resulting cotton material has a stiff finish which is not spoiled by washing with soap and water.

In a manner similar to the above examples, other compounds of the general formula above may be applied for the purpose of this invention, either before, or after, or simultaneously with the application of starch. The following is a list of compounds actually tried by us in this invention and found satisfactory more or less:

Octadecyloxymethyl quinolinium chloride.
Octadecyloxymethyl triethanolammonium chloride.
Octyloxymethyl pyridinium chloride.
Sec. dodecyloxymethyl pyridinium chloride.
N-carbomethoxyundecylamino methyl pyridinium chloride.
N-carbomethoxybutylaminomethyl pyridinium chloride.
Stearanilidomethyl pyridinium chloride.
Acetoundecylamido methyl pyridinium chloride.
Oleamidomethyl pyridinium chloride.
Bis(methyl pyridinium chloride) ether of ethylene glycol.
Cetyloxymethyl pyridinium acid oxalate.
Octadecyloxymethyl pyridinium chloride.
Cetyloxy methyl pyridinium chloride.
Pyridinium derivative from chloromethyl ethers of sperm oil alcohols.
Dodecyloxymethyl pyridinium chloride.
Cetyloxymethyl trimethyl ammonium chloride.
N-methyl stearamido methyl pyridinium chloride.
N-carbomethoxyheptadecyl amino methyl pyridinium chloride.
Stearamido methyl pyridinium chloride or sulfate.
Cetyloxy methyl pyridinium sulfite or pyrosulphite as pyridine salt.
Stearamido methoxy methyl pyridinium sulfite or pyrosulphite as pyridine salt.
p-Stearamido phenyl amino methyl pyridinium sulfite or pyrosulphite as pyridine salt.
Stearamido methyl pyridinium chloride.
Butyloxy methyl pyridinium chloride.
Methyloxy methyl pyridinium chloride.

Some of the agents in the above table are known compounds, and their preparation has been described in the literature (see for instance, Br. Pats. No. 390,553, and 394,196). Others are novel compounds, and are prepared by methods of which the following recipes, showing the preparation of the compounds mentioned in Examples 6, 9, 10, 14, 15, and 16 above are typical.

*Recipe A.—Preparation of the compound mentioned in Example 15*

10 parts of stearamide, 2 parts of paraformaldehyde, 10 parts of anhydrous pyridine hydrochloride and 40 parts of pyridine are heated and stirred under reflux at 70°–80° C. until a test sample of the reaction mixture gives a clear solution in water. The mixture is now cooled, whereupon the product crystallizes out almost entirely and is filtered off. The new compound, which may be further purified, if desired, by recrystallization from acetone, is readily soluble in water at 40°–50° C. to give clear, foaming solutions.

If, in the above example, the pyridine hydrochloride is replaced by molecular equivalent amounts of pyridine hydrobromide, pyridine nitrate or pyridine-m-nitrobenzoate, similar products which are readily soluble in water to give clear, foaming solutions, are obtained.

*Recipe B.—Preparation of the compound mentioned in Example 16*

33 parts of sodium pyrosulphate and 50 parts of pyridine are heated together at 90°–95° C. for 30 minutes. The resulting mixture of pyridine-sulphur trioxide and pyridine is cooled to 45–50° C. and 31.3 parts of stearo-hydroxymethylamide are added. The reaction mixture is stirred at 45°–50° C. until (about 30 minutes) a test sample dissolves readily in water to give a clear foaming solution. The reaction mixture is then filtered. The filtrate on cooling is a viscous liquid. The excess of pyridine may be removed from the filtrate by distillation at 50–55° C. under reduced pressure. The new compound is thus obtained as a white crystalline powder, almost insoluble in acetone. Alternatively, the new compound, which is also sparingly soluble in ice-water, may be isolated from the reaction mixture or the viscous filtrate by diluting with ice-water. The suspension so obtained is filtered whilst ice-cold and the product washed with ice-water. The new compound is thus obtained as a white powder which is soluble in warm water to give clear, foaming solutions.

The stearohydroxymethylamide used as starting material is a new compound. It is prepared as follows:—

28.3 parts of stearamide, 3 parts of paraformaldehyde, 7 parts of pulverized anhydrous potassium carbonate and 50 parts of benzene are stirred together at 50° C. In a short time reaction takes place; the temperature rises sharply to about 60° C. and the reaction mixture becomes a stiff, white paste. The pasty mass is allowed to cool and is then filtered, pressed, dried, washed free from potassium carbonate with warm water and again dried. The new compound is a light coloured powder. It is very sparingly soluble in acetone or benzene, but soluble in methyl alcohol from which it may be crystallized as white needles, M. P. 115° C.

*Recipe C.—Preparation of the cetoxymethyl-pyridinium acid oxalate mentioned in Examples 6 and 12*

25 parts of cetyl alcohol, 8 parts of paraformaldehyde and 64 parts of pyridine are mixed together and heated to 80° C. Sulphur dioxide is passed into the mixture, the temperature being maintained at 80–90° C. The introduction of sulphur dioxide is continued until the mixture becomes completely soluble in cold water as shown by a test. 9.3 parts of anhydrous oxalic acid are then added and the mass stirred at 85–90° C. until the oxalic acid has dissolved. The solution is allowed to stand until no more crystals separate. The crystalline material is filtered off and washed with pyridine. The colourless crystalline oxalate so obtained is dried.

*Recipe D.—Preparation of the bis(chloro-pyridiniummethyl)-ether of ethylene-glycol, mentioned in Example 9*

124 parts of ethylene glycol and 120 parts of paraformaldehyde are mixed, kept cool, and stirred whilst hydrogen chloride is passed in. When the 120 parts of paraformaldehyde has dissolved a further 60 parts is added. Hydrogen chloride is introduced until no more is absorbed.

To the liquid obtained 200 parts of carbon tetrachloride are added and an aqueous layer which separates is decanted away. The carbon tetrachloride solution is dried over anhydrous magnesium sulphate, filtered and the carbon tetrachloride is distilled off. The oil is distilled (B. P. 93–98° C./12 m. m. pressure).

This compound is the bis(chlormethyl) ether of ethylene glycol.

To 50 parts of pyridine in 300 parts of dry benzene are slowly added with stirring 50 parts of the above ether. A crystalline solid separates, which is quickly filtered off and dried, as the compound is hygroscopic. The new compound is conveniently kept in aqueous solution.

*Recipe E.—Preparation of the pyridine-cetoxymethyl pyridinium sulfite, mentioned in Example 10*

30 parts of cetyl alcohol, 12 parts of paraformaldehyde and 120 parts of pyridine are heated together at 90–100° C. under a reflux condenser. Gaseous sulphur dioxide is passed into the heated mixture until a test sample from the mixture dissolves readily in water to give a clear solution.

*Recipe F*

30 parts by weight of stearamide, 120 parts by weight of pyridine and 12 parts by weight of paraformaldehyde are stirred together at 90–95° C. and gaseous sulphur dioxide is bubbled into the solution until a test sample of the reaction mixture dissolves to a clear solution in water. Most of the excess pyridine and paraformaldehyde are removed from the reaction mixture by distillation below 50° C. under reduced pressure, e. g. 15 mm. and the residue, a viscous liquid constitutes the desired product, which may be further purified, if desired, by crystallization from acetone.

It will be understood that while in the above examples we illustrated our invention by applying it throughout to cotton fabric, our invention is not limited to fabric but may be applied to cellulosic material in any form, whether textile fabric, yarn, thread, gauze, or even paper.

We claim:

1. The process of improving the fastness of starch upon textile material, which comprises incorporating into the material in addition to the starch, a quaternary ammonium compound of the general formula

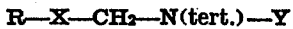

wherein N(tert.) represents the molecule of a tertiary organic base, Y represents the anion of a salt-forming acid, X stands for a non-carbonic link of the group consisting of oxygen, sulfur, imino and substituted imino, and R stands for an organic radical free from water-solubilizing groups, and heating the material at a temperature sufficient to decompose said quaternary compound.

2. The process of improving the fastness of starch upon cellulosic material, which comprises impregnating said material in optional time relation to the starching operation, with an aqueous solution of a quaternary ammonium compound of the general formula

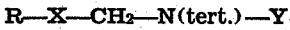

wherein N(tert.) represents the molecule of a tertiary organic base, Y represents the anion of a salt-forming acid, X stands for a non-carbonic link of the group consisting of oxygen, sulfur, imino and substituted imino, and R stands for an organic radical free from water-solubilizing groups, and heating the material at a temperature sufficient to decompose said quaternary compound.

3. The process of producing a permanent starch finish upon cellulosic textile material, which comprises impregnating said material in optional order, with an aqueous starch preparation and a solution of a quaternary ammonium compound of the general formula

wherein N(tert.) represents the molecule of a tertiary organic base, Y represents the anion of a salt-forming acid, X stands for a non-carbonic link of the group consisting of oxygen, sulfur, imino and substituted imino, and R stands for an organic radical free from water-solubilizing groups, drying said material at a temperature insufficient to cause substantial decomposition of said quaternary compound, and then baking said material in the absence of moisture at a temperature favoring decomposition of said quaternary compound.

4. The process of producing a permanent starch finish upon cellulosic textile material, which comprises impregnating said material in optional time relation with an aqueous starch preparation and with an aqueous solution of a quaternary organic compound of the general formula

wherein N(tert.) represents the molecule of a tertiary organic base, Y represents the anion portion of a salt-forming acid, and R stands for an aliphatic radical free from water-solubilizing groups, drying said material at a temperature not exceeding 40° C. and then further heating said material, in the absence of moisture, at a temperature between 90 and 140° C. whereby to decompose said quaternary compound.

5. The process of producing a permanent starch finish upon cellulosic textile material, which comprises impregnating said material in optional time relation with an aqueous starch preparation and with an aqueous solution of a quaternary organic compound of the general formula

wherein N(tert.) represents the molecule of a tertiary organic base, Y represents the anion portion of a salt-forming acid, R stands for an alkyl radical, while $R_1$ stands for hydrogen or an alkyl radical, drying said material at a temperature not exceeding 90° C. and then heating said material, in the absence of moisture, at a temperature between 90 and 140° C., whereby to decompose said quaternary compound and split off its tertiary base.

6. The process of fixing starch upon cellulosic fabric, whereby to render it resistant to washing, which comprises treating the starched fabric in an aqueous bath of a quaternary ammonium compound of the general formula

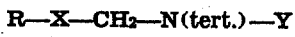

wherein N(tert.) represents the molecule of a tertiary organic base, Y represents the anion of a salt-forming acid, X stands for a non-carbonic link of the group consisting of oxygen, sulfur, imino and substituted imino, and R stands for an organic radical free from water-solubilizing groups, drying said fabric under conditions avoiding undue decomposition of the quaternary compound, and then heating the dried, starched fabric at a temperature favoring the decomposition of said quaternary compound in the absence of moisture.

7. The process of producing a permanent starch finish upon cellulosic fabric which comprises impregnating said fabric with an aqueous solution of a quaternary ammonium compound of the general formula

wherein N(tert.) represents the molecule of a tertiary organic base, Y represents the anion of a salt-forming acid, X stands for a non-carbonic link of the group consisting of oxygen, sulfur, imino and substituted imino, and R stands for an organic radical free from water-solubilizing groups, applying an aqueous starch preparation to said fabric, drying said fabric at a temperature insufficient to decompose said quaternary compound, and finally heating the dried fabric at a temperature favoring the decomposition of said quaternary compound in the absence of moisture.

8. The process of producing a permanent starch finish upon cellulosic textile material, which comprises impregnating said material with an aqueous preparation containing starch and a quaternary ammonium compound of the general formula

wherein N(tert.) represents the molecule of a tertiary organic base, Y represents the anion of a salt-forming acid, X stands for a non-carbonic link of the group consisting of oxygen, sulfur, imino and substituted imino, and R stands for an organic radical free from water-solubilizing groups, drying the material thus impregnated at a temperature insufficient to decompose the bulk of said quaternary compounds and then heating the dried material in the absence of moisture at a temperature favoring the decomposition of said quaternary compound.

9. Starched textile material impregnated with a decomposition product of a quaternary ammonium compound as defined in claim 1.

10. Cellulosic material containing a starch finish and a starch fixing agent as defined in claim 4.

11. Cellulosic material containing a starch finish and a starch fixing agent as defined in claim 5.

12. The process of improving the fastness of starch upon cellulosic textile material which comprises incorporating into said material, in addition to starch, a quaternary ammonium compound of the general formula

wherein R stands for an aliphatic radical containing a chain of at least 8 carbon atoms and being free from water-solubilizing groups, X stands for an inorganic link of the group consisting of oxygen, sulfur, imino and substituted imino, Z stands for a tertiary nitrogenous base of the group consisting of aliphatic, cycloaliphatic and heterocyclic nitrogenous bases, and Y represents the anion of a salt forming acid, and heating the material at a temperature sufficient to decompose said quaternary compound.

13. The process of improving the fastness of starch upon cellulosic textile material which comprises incorporating into said material, in addition to starch, a quaternary ammonium compound of the general formula

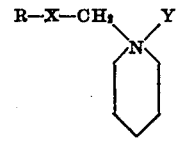

wherein R stands for an aliphatic radical containing a chain of at least 8 carbon atoms and being free from water-solubilizing groups, X stands for an inorganic link of the group consisting of oxygen, sulfur, imino and substituted imino, and Y represents the anion of a salt forming acid, and heating the material at a temperature sufficient to decompose said quaternary compound.

14. The process of producing a permanent starch finish upon cellulosic material, which comprises impregnating said material in optional time relation with an aqueous starch preparation and with an aqueous solution of a quaternary organic compound of the general formula

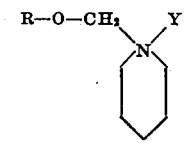

wherein R stands for an aliphatic hydrocarbon radical, while Y represents the anion of a salt forming acid, drying said material at a temperature not exceeding 40° C. and then further heating said material, in the absence of moisture, at a temperature between 90 and 140° C. whereby to decompose said quaternary compound.

15. The process of producing a permanent starch finish upon cellulosic material, which comprises impregnating said material in optional time relation with an aqueous starch preparation and with an aqueous solution of a quaternary organic compound of the general formula

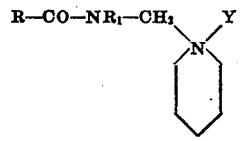

wherein R represents an aliphatic hydrocarbon radical, $R_1$ represents hydrogen or an aliphatic hydrocarbon radical, while Y represents the anion of a salt forming acid, drying said material at a temperature not exceeding 90° C. and then heating said material, in the absence of moisture, at a temperature between 90°. and 140° C., whereby to decompose said quaternary compound and split off its tertiary base.

JOHN GWYNANT EVANS.
CHARLES EDWARD SALKELD.